April 5, 1927.  E. SZEPESI  1,623,216
INSTRUMENT FOR GRAPHIC CONTROL
Filed Aug. 26, 1925   2 Sheets-Sheet 1
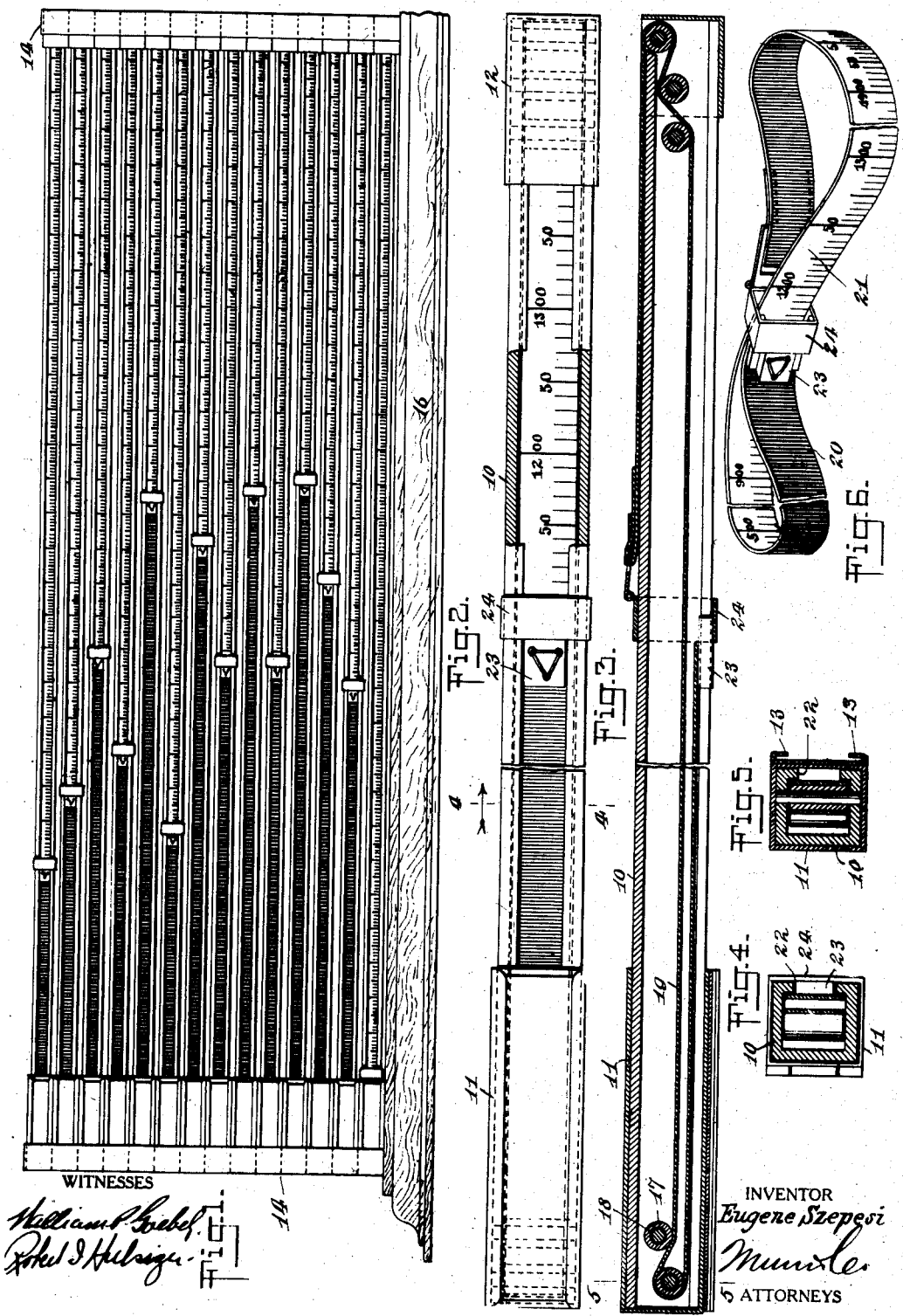
INVENTOR
Eugene Szepesi
ATTORNEYS April 5, 1927.
E. SZEPESI
1,623,216
INSTRUMENT FOR GRAPHIC CONTROL
Filed Aug. 26, 1925  2 Sheets-Sheet 2
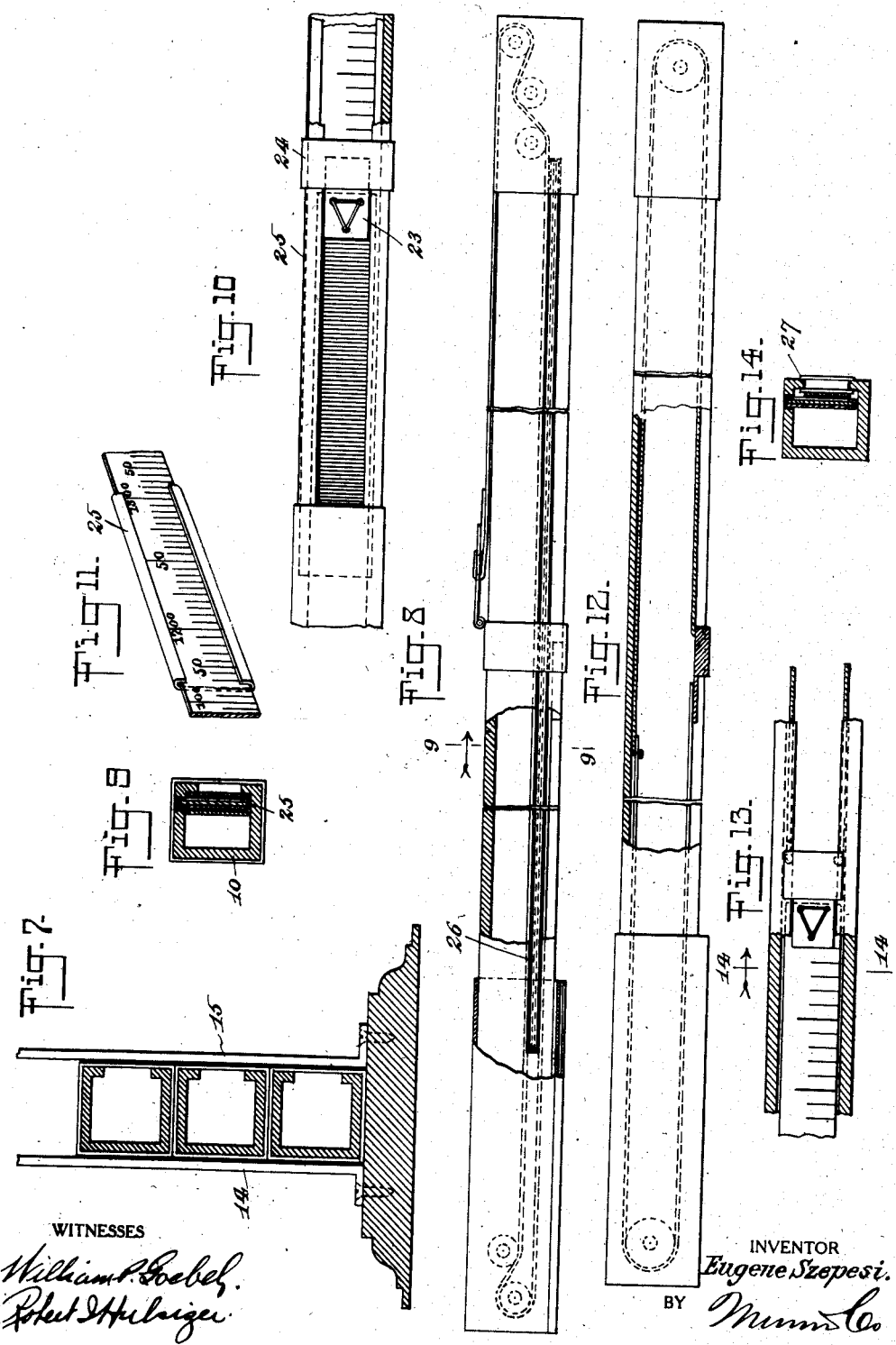
WITNESSES
INVENTOR
Eugene Szepesi.
BY
ATTORNEYS Patented Apr. 5, 1927.

1,623,216

UNITED STATES PATENT OFFICE.

EUGENE SZEPESI, OF BOSTON, MASSACHUSETTS.

INSTRUMENT FOR GRAPHIC CONTROL.

Application filed August 26, 1925. Serial No. 52,698.

This invention relates to an instrument for graphic control.

My invention refers to a mechanical improvement of graphic bar charts which principle of control has been accepted by modern business as the most desirable means of presenting facts accurately, because it permits the comparison of magnitudes to one another directly and visibly.

According to this principle the comparison of magnitudes is done by lines compared to a scale, representing numbers instead of by numbers themselves.

The relative position of two lines to a standard scale is more clearly visualized by the human mind than if this relation is recorded by numbers representing the magnitudes.

The simplest and therefore the most useful mode of graphic presentation is by bar charts in which the magnitudes represented have a relation to the scale divisions, representing the unit magnitudes, and which chart may be arranged either horizontally or vertically; the different facts represented might be distinguished by any combination of colors and the scales which determine the relative positions of the different bar units of a chart might be divided into any units.

Up to the present time the mechanism employed, permitting the use of such charts have been of primitive construction, greatly limiting thereby the universal application of this mode of presentation of facts; and in general constructed with insignificant variations, according to the following procedures:

Drawn on paper or other material upon which the scales of comparison were drawn at the bottom, top or either side, or under each unit represented. The bars themselves were drawn in with pencil, ink or other materials and when a condition had to be presented in which the shrinkage of the magnitude had to be shown, the corresponding part of the bar had to be erased.

Additional subjects for presentation of facts if space has not been previously provided for, were to be added either at the top or the bottom, or at either side of the board, disrupting thereby the sequence of the order of the facts presented. The rearrangement of the whole chart, to conform with changed conditions, was not possible and required the construction of a new chart altogether.

Another form in use at the present time consists of a board upon which the scales of comparison are either drawn directly upon the board or inserted in holders and the ribbons, which are used for representation of the bars are inserted on, above or below such scales upon a self winding arrangement known as back runners, which automatically wind up the ribbon when a bar is to be shortened. The other end of the ribbon is fastened to the board with a pin or similar contrivance.

The disadvantages of this type of board are; first, its inflexibility because to change the relative position of one bar upon the board all other bars must be rearranged by moving each individual scale up or down, or indefinite spaces to be provided between the bars upon the board for the anticipation of future additions.

The other disadvantage of this type of construction lies in the fact that the method of fastening the ribbon ends to the board is insecure; they may become loose and run back to the zero point, on account of the self winding arrangement, or after a while the pin holes require replacement of the board altogether because the worn out holes will not hold the ribbons in secure position.

The third method used at the present time consists of transparent tubes made of celluloid or similar material and of oval shape, the front of which is slit to permit the moving of the bars.

The scale of comparison in this construction is inserted into such oval holders and the bars themselves are made of similar material as the oval tubes but of opaque construction, which bar is also put into the tube above the scale of comparison and provided with a holder at one end by which the tube can be moved forward or backward.

The arrangement of this graphic bar chart necessitates however that the useful scale of the chart and the indicator bar itself can be only one half the size of the oval container tube, because the other half is needed to cover such parts of the bar which are not in actual use for the indication of the magnitudes.

This reduces the effectiveness of such bar charts to one half of its width, and since bar charts are practical only if the space required for the presentation is concentrated to the minimum, and for all practical purposes its total length should not exceed four feet; the useful part of the graphic bar charts of this kind are therefore limited to a space of two feet, which again will not permit the division of the scale of comparison fine enough to serve a practical purpose.

The removability and the interchangeability of bar charts of such construction is also limited to short lengths, which again robs the bar chart of its maximum usefulness. At any useful length these bars sag and therefore they must be fastened to the board, eliminating thereby this interchangeability feature, and even if such constructions are supported in the frame with cross bars at different places at any useful length they will sag with an increase of humidity, making their appearance unsightly and their use difficult.

My invention overcomes the disadvantages of the present mechanical constructions and provides the following novel features in bar chart construction:

1. Each unit of bar chart upon the board is an individual unit in itself. Its position to other bar charts on the board can be changed to any other desired position; it may be inserted between two other bars in any part of the board; it may be added to a board at any space; it may be taken away without leaving empty gaps between the bars upon the board, and the subsequent order of the bars upon the board may be rearranged without any disturbance of the position of the bar to the scale of measure in the individual units themselves.

2. The movement of an indicator bar is positive and once adjusted to a position the bar will remain in the adjusted position until it is purposely moved into another position.

3. Without a loss of its interchangeability or its positive adjustment feature the useful scale of the bars may extend the full length of the bar no matter what the length.

The mechanical construction of the bar chart embodying the above novel features can be obtained in three different arrangements as follows:

The invention is illustrated in the drawings of which Figure 1 is a front elevation of a series of my control units;

Figure 2 is a front elevation with a portion broken away of one of the units;

Figure 3 is a horizontal longitudinal section of the unit shown in Figure 2;

Figure 4 is a vertical transverse section taken on the line 4—4 of Figure 2;

Figure 5 is a vertical transverse section taken on the line 5—5 of Figure 3;

Figure 6 is a perspective view of the indicator ribbon and guide;

Figure 7 is a partial vertical transverse section taken through the device as shown in Figure 1;

Figure 8 is a plan view partly broken away showing a modified form of the unit;

Figure 9 is a transverse vertical section taken on the line 9—9 of Figure 8;

Figure 10 is a partial front elevation of the form of the unit shown in Figure 8;

Figure 11 is a partial perspective view of a modified form of the indicator strip used in modification shown in Figure 8;

Figure 12 is a plan view partly broken away showing a still further modification of the unit;

Figure 13 is a partial front elevation of the form of the invention shown in Figure 12;

Figure 14 is a transverse vertical section taken on the line 14—14 of Figure 13.

The form of the invention shown in the drawings is a preferred form, although it is understood that modifications in the construction and arrangement of the parts and in the character of the materials used may be adopted without departing from the spirit of the invention as set forth in the appended claims.

In the preferred forms of the invention shown in the drawing I employ a casing 10 preferably of rigid metal and as shown in Figure 4 of a U-shaped cross section having a slot in its front face. This casing forms one of the units. The ends of this casing are supported in metal tubes or shells 11 and 12 on its respective ends. The shell 11 on its front face is provided with flanges such as 13 to permit of the reception of a card on which can be printed any desired information. As shown in Figure 7 these supporting shells are held between vertical guide bars such as 14 and 15 and these guide bars are mounted on a base 16. The primary purpose of these supporting shells permit the placement of the individual casings or bars on top of each other in the form of a frame, which, as a whole, constitutes a board and yet at the same time leaves sufficient space between the units to permit a free movement of the guide plates hereinafter mentioned, a portion of each of which, in one form of the invention, embraces the individual casings.

As shown in Figure 3 each of the casings 10 is provided with one or more rollers such as 17 disposed vertically adjacent the ends of the casing for rotary movement around pin 18 fastened therein. These tubes or rollers act as tension guides for a ribbon 19. This ribbon on one side thereof has a surface which is colored, such as 20, and on the other side, such as 21, is provided with a suitable scale marked with graduations.

The slot in the front of the casing which I will designate by the numeral 22, is adapted to act as a rail for a portion 23 of a guide plate 24, which, in the form shown in Figures 1 to 5 passes completely around the casing 10. This guide plate can thus be slid along the casing. The ribbon is connected at both ends to this guide plate, one end being connected to the front portion of the guide plate, as shown in Figure 3, and the other end being connected in any suitable manner to the rear portion of the guide plate.

As shown in the first five figures, this ribbon as mounted is twice the length of the casing approximately and thereby permits the construction of a scale thereon with divisions twice as fine as if its length were the same as the casing. This feature will decidedly increase the usefulness of the unit because the magnitudes can be more accurately represented. The divisions on the scale can be plotted in logarithmic value thereby permitting the adjustment of the ribbon with much greater accuracy.

As shown in Figures 2 and 3 it will be apparent that the portion of the ribbon to the left of the guide plate 24 will be the colored or unmarked portion, whereas the portion to the right of the guide plate will be the marked portion and it will therefore be observed that the right end edge of the guide plate will act as an indicator line for the adjustment of the ribbon.

In a modification shown in Figures 8, 9, 10 and 11, the differences in the construction are as follows, In the first place, the ribbon has no scale on it and is only colored on one side. The scale is contained within a light metal or celluloid frame such as 25 (see Figure 11) which is inserted in the top of the casing by reason of a slot 26 (see Figure 8) and this stationary scale is covered or uncovered by the movement of the guide 24 in the manner previously described. In this modification also the rolls may or may not be the same as above described.

In the modification shown in Figures 12, 13 and 14 only two rolls are used and the ribbon is only the length substantially equal to the length of the casing. The ends of the ribbon at the top and the bottom of each end being connected by cords which lie back of the flanges of the casing and are therefore hidden from view. In this modification also the scale is separate from the ribbon and is fixedly mounted as shown in Figures 8, 9 and 14. Furthermore in the form shown in Figure 14 the guide member does not embrace the casing but is provided with flanged rolls such as 27 lying on opposite sides of the flanges of the casing and riding in the slot of the casing as shown.

The invention is a graphic bar chart constructed according to any of the above descriptions, or combinations thereof, which permits the individual graphic bar units to be placed in a frame to form a graphic chart board, which individual units can be taken out, added to within the size of the board, or rearranged in any desired subsequent order without disturbing the magnitudes indicated on the individual bar units.

By positive adjustment the indicating bars will retain their position until definitely removed from such position.

The arrangement of a bar chart in such a manner that the indicating scale is reproduced upon the ribbon itself, which has been arranged for the bar chart upon a logarithmic scale.

The arrangement of a bar chart into which the scale of comparison is inserted into the individual units themselves and such scales do not touch either the back or the front of the casing.

A bar chart in which the indicator bar is made of a combination of ribbon and string.

What I claim is:—

1. A graphic control device which comprises a hollow casing having a longitudinal slot in its front wall, an indicator ribbon mounted within the casing for movement so that different portions of the ribbon will be visible through the slot with one portion adjacent the other, a guide member movable along the front of the casing to which guide member the ends of the ribbon are connected, one side of the ribbon being plainly colored and the other side having a scale thereon so that as the guide member is moved the foremost portion of the ribbon connected to the guide member will cover any desired portion of the ribbon behind the same to exhibit a particular part of the scale visible through the slot, and with the colored face of the foremost portion of the ribbon also visible.

2. A graphic control device comprising a supporting structure, graphic units removably supported by said supporting structure in superposed relationship, each of said graphic units comprising a casing having a sight opening in the front wall thereof extending longitudinally of the casing, an arrangement of rollers in the casing, a ribbon supported for movement by the rollers with portions thereof in overlapped relationship, a slide carried by the casinig for longitudinal movement, the opposite ends of the ribbon attached respectively to front and rear portions of the slide, the end of the ribbon attached to the front portion of the slide so that the slide and one of the rollers maintain a portion of the ribbon movably disposed in front of another portion of the ribbon parallel thereto, the latter portion of the ribbon appearing through the sight opening, one side of the ribbon being distinctively colored and the other side having a scale whereby upon movement of the slide any particular part of the scale on a portion of the ribbon adjacent the sight opening may be exhibited adjacent a colored portion of the ribbon adjacent the sight opening.

3. In a device of the class described, a casing having a sight opening therein, a member arranged for movement longitudinally of the casing, a ribbon having a scale one one side thereof and the other side being blank, means in the casing around which the ribbon is passed and on which the ribbon is supported for movement, there being an opening in the rear wall of the casing through which the ribbon passes to permit one end thereof to be attached to the rear portion of said member, the other end of the ribbon being attached to the front portion of said member, the ribbon being so arranged that different portions will be visible through said sight opening with the blank side of one portion adjacent the scale side of another portion, whereby upon movement of said member any particular part of the scale will be exhibited in conjunction with one edge of said member which serves as a marker.

4. A graphic unit of the class described, comprising a casing having a sight opening in the front wall thereof extending longitudinally of the casing, an arrangement of rollers in the casing, a ribbon supported for movement by the rollers with portions thereof in overlapped relationship, a slide carried by the casing for relative longitudinal movement, the opposite ends of the ribbon attached respectively to front and rear portions of the slide, the end portion of the ribbon attached to the front portion of the slide being maintained movably disposed in front of another portion of the ribbon parallel thereto, the latter portion of the ribbon being disposed adjacent the sight opening, one side of the ribbon being distinctively colored and the other side having a scale, whereby upon movement of the slide any particular part of the scale on one portion of the ribbon adjacent the sight opening may be exhibited adjacent a colored face of a portion of the ribbon adjacent the sight opening.

5. A graphic control device comprising a supporting structure, graphic units removably supported by said supporting structure in superposed relationship, each of said units including a casing having a sight opening, a ribbon having suitable indicia on one side thereof and the other side being distinctively colored, and means carried by the casing operable in conjunction with the ribbon for presenting any desired portion of the indicia adjacent a colored portion of the ribbon at the sight opening of said casing.

EUGENE SZEPESI.